(12) United States Patent
Kottapalli et al.

(10) Patent No.: US 10,708,223 B2
(45) Date of Patent: Jul. 7, 2020

(54) DYNAMICALLY DEFINING ENCRYPTION SPACES ACROSS MULTIPLE DATA CENTERS

(71) Applicant: NICIRA, INC., Palo Alto, CA (US)

(72) Inventors: Ravi Kumar Reddy Kottapalli, Bangalore (IN); Madhavan Srinivass Sampath, Bangalore (IN); Srinivas Sampatkumar Hemige, Bangalore (IN)

(73) Assignee: Nicira, Inc., Palo Alto, CA (US)

( * ) Notice: Subject to any disclaimer, the term of this patent is extended or adjusted under 35 U.S.C. 154(b) by 99 days.

(21) Appl. No.: 15/900,820

(22) Filed: Feb. 21, 2018

(65) Prior Publication Data

US 2019/0199679 A1     Jun. 27, 2019

(30) Foreign Application Priority Data

Dec. 22, 2017   (IN) .............................. 201741046365

(51) Int. Cl.
| | | |
|---|---|---|
| *G06F 15/177* | (2006.01) | |
| *H04L 29/12* | (2006.01) | |
| *H04L 12/66* | (2006.01) | |
| *H04L 29/06* | (2006.01) | |
| *H04L 12/24* | (2006.01) | |
| *H04L 29/08* | (2006.01) | |

(52) U.S. Cl.
CPC .......... *H04L 61/2015* (2013.01); *H04L 12/66* (2013.01); *H04L 41/0806* (2013.01); *H04L 61/2007* (2013.01); *H04L 63/101* (2013.01); *H04L 63/164* (2013.01); *H04L 67/141* (2013.01); *H04L 61/6068* (2013.01)

(58) Field of Classification Search
CPC ................. H04L 43/0876; H04L 45/02; H04L 29/08171; H04L 29/12028; G06Q 30/04
See application file for complete search history.

(56) References Cited

U.S. PATENT DOCUMENTS

| | | | |
|---|---|---|---|
| 9,325,561 B2* | 4/2016 | Uttaro | H04L 29/08171 |
| 10,217,145 B1* | 2/2019 | Ye | G06Q 30/04 |
| 2007/0039037 A1* | 2/2007 | Son | H04L 41/0883 726/2 |
| 2007/0058568 A1* | 3/2007 | Previdi | H04L 45/02 370/254 |
| 2007/0261102 A1* | 11/2007 | Spataro | G06F 21/604 726/2 |

(Continued)

*Primary Examiner* — Brian Whipple
*Assistant Examiner* — Gregory P Tolchinsky

(57) ABSTRACT

Described herein are systems, methods, and software to enhance the management of encryption addressing across multiple virtual computing sites. In one implementation, a first edge gateway at a first computing site may obtain, via border gateway protocol (BGP), one or more internet protocol (IP) address prefixes from a second edge gateway of a second computing site. The first edge gateway may further update an access control list (ACL) at the first edge gateway based on the one or more prefixes, wherein the ACL provides permissions in IPSec communications between a plurality of virtual nodes at the first computing site and a plurality of virtual nodes at the second site. Once the ACL is updated, the first edge gateway may forward communications based on the ACL using IPSec protocol.

20 Claims, 8 Drawing Sheets

(56) References Cited

U.S. PATENT DOCUMENTS

| | | | |
|---|---|---|---|
| 2009/0285215 A1* | 11/2009 | Kaippallimalil | ............................ H04L 29/12028 370/392 |
| 2014/0036663 A1* | 2/2014 | Narayanan | ............ H04L 45/125 370/230 |
| 2016/0014025 A1* | 1/2016 | Wang | .................... H04L 67/148 370/392 |
| 2018/0026895 A1* | 1/2018 | Wang | .................... H04L 41/142 370/235 |
| 2018/0109450 A1* | 4/2018 | Filsfils | .................... H04L 45/74 |
| 2018/0123946 A1* | 5/2018 | Ramachandran | ..... H04L 45/748 |
| 2018/0302410 A1* | 10/2018 | Venkataraman | ...... H04L 63/101 |
| 2018/0323891 A1* | 11/2018 | Dubey | ................ H04L 67/1095 |

\* cited by examiner

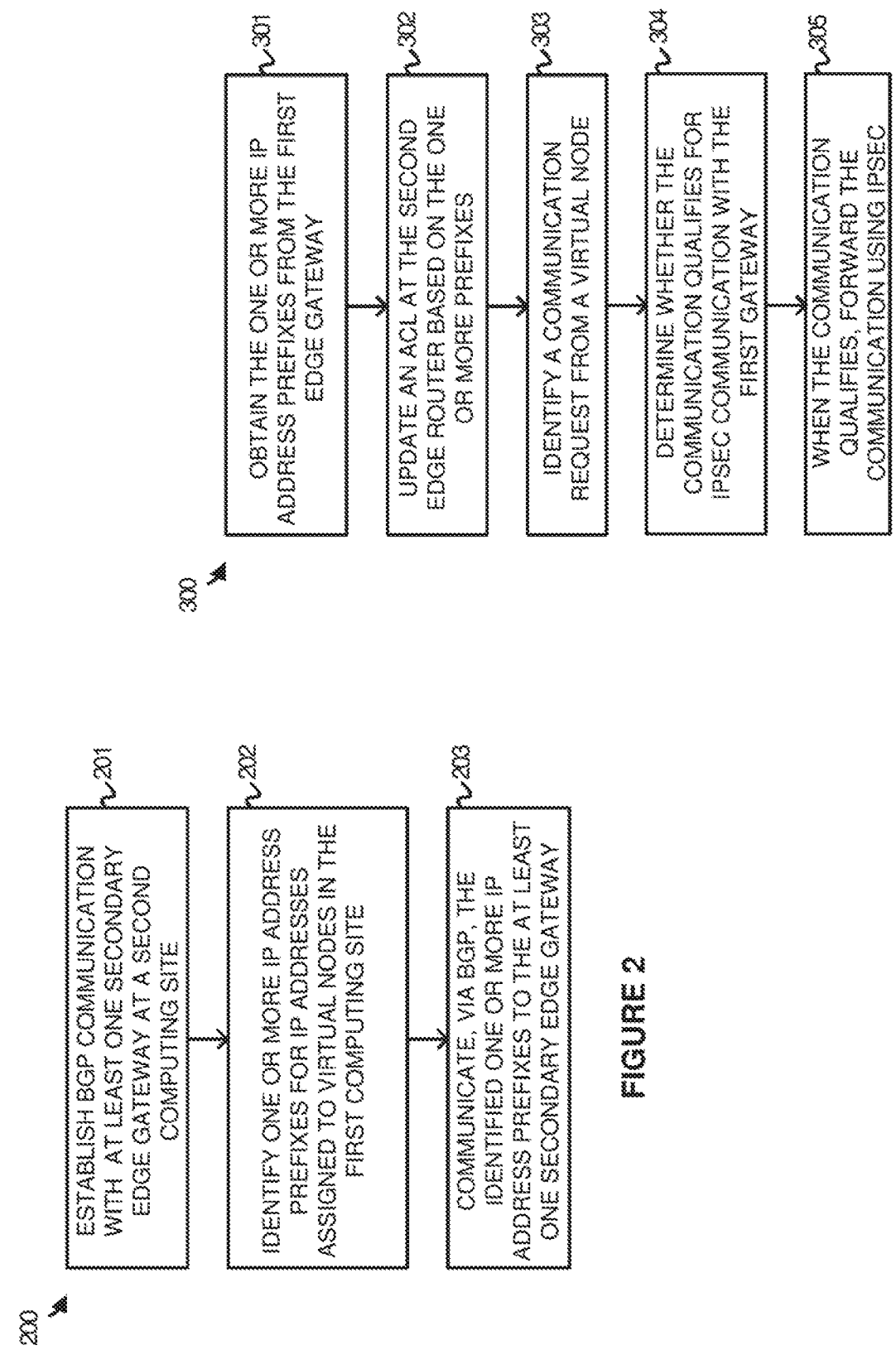

DYNAMICALLY DEFINING ENCRYPTION SPACES ACROSS MULTIPLE DATA CENTERS

RELATED APPLICATIONS

Benefit is claimed under 35 U.S.C. 119(a)-(d) to Foreign Application Serial No. 201741046365 filed in India entitled "DYNAMICALLY DEFINING ENCRYPTION SPACES ACROSS MULTIPLE DATA CENTERS", on Dec. 22, 2017, by Nicira, Inc., which is herein incorporated in its entirety by reference for all purposes.

TECHNICAL BACKGROUND

In computing environments, software defined networks may be used that comprise software modules capable of providing a communication platform for one or more virtual nodes in the computing environment. The software defined networks, which may include logical switches, routers, distributed firewalls, and the like, may be used to intelligently direct communication on the network by inspecting packets before passing them to other computing nodes. For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

In some implementations, computing environments, such as those employed for an organization, may employ edge gateways that can be used as a virtual router to communicate packets between the organization's various computing sites. These edge gateways may provide network services such as static routing, virtual private networking, load balancing, firewall operations, Dynamic Host Configuration Protocol (DHCP), and network address translation. In some examples, the edge gateways may provide Internet Protocol Security (IPSec) communications between computing sites of the organization's environment. However, configuring address control lists (ACLs) for the gateways may be difficult and cumbersome for an administrator of the computing environment. In particular, difficulties arise in configuring the edge gateways at each computing site, and notifying the gateways when new virtual nodes become available.

SUMMARY

The technology described herein enhances the deployment of encrypted network communications between computing sites of an organization's network. In one implementation, a method of operating an edge gateway in a first computing site that comprises a plurality of virtual nodes includes obtaining, via border gateway protocol (BGP), one or more internet protocol (IP) address prefixes from a second edge gateway of a second computing site. The method further includes updating an access control list (ACL) at the first edge gateway based on the one or more prefixes, wherein the ACL provides permissions in IPSec communications between the plurality of virtual nodes at the first computing site and a plurality of virtual nodes at least the second site. The method also provides identifying a communication request from a virtual node at the first computing site, determining whether the communication qualifies for an Internet Protocol Security (IPSec) protocol communication with the second edge gateway based on the ACL and at least a destination IP address for the communication, and when the communication does qualify for the IPSec protocol, transferring the communication to the second edge gateway via IPSec protocol.

BRIEF DESCRIPTION OF THE DRAWINGS

FIG. 2 illustrates an operation of an edge gateway to communicate internet protocol (IP) address prefixes to a second edge gateway according to an implementation.

FIG. 3 illustrates an operation of an edge gateway to update an access control list according to an implementation.

DETAILED DESCRIPTION

Figure 1:
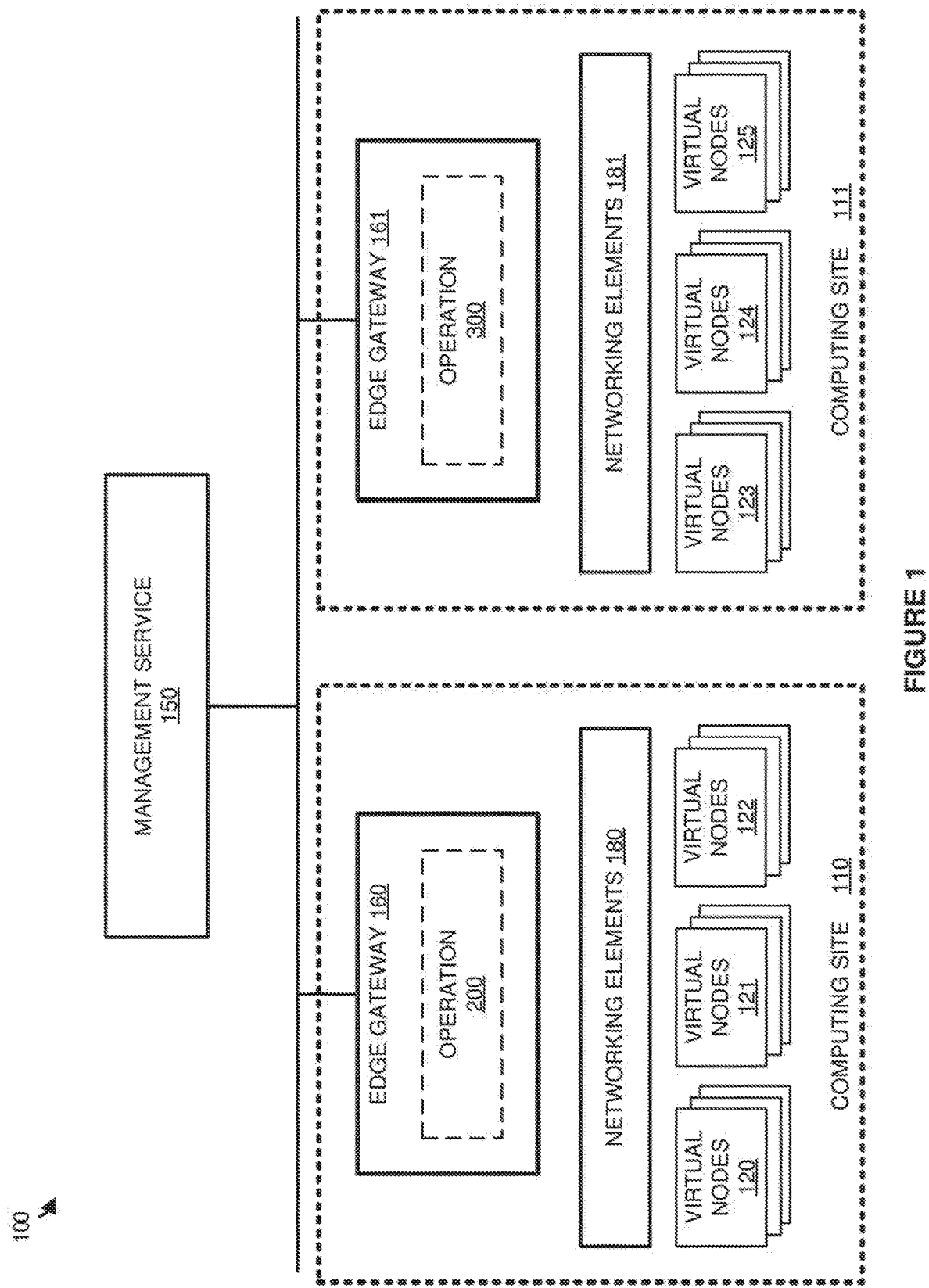
FIG. 1 illustrates a computing environment to dynamically define encryption spaces across multiple computing sites.

FIG. 1 illustrates a computing environment 100 to dynamically define encryption spaces across multiple computing sites. Computing environment 100 includes computing sites 110-111 and management service 150. Computing sites 110-111 further include edge gateways 160-161, networking elements 180-181, and virtual nodes 120-125, wherein each set of virtual nodes in virtual nodes 120-125 corresponds to a different Internet protocol (IP) address prefix. Edge gateway 160 provides operation 200, which is further described in FIG. 2, and edge gateway 161 provides operation 300, which is further described in FIG. 3. Each computing site of computing sites 110-111 may comprise one or more physical computing systems, such as host servers, capable of providing a platform for the virtual nodes, networking elements, and edge gateways. Further, management service 150 may comprise one or more computing systems, such as server computing systems, desktop computing systems, or some other similar computing system capable of providing configuration information to the computing sites.

In operation, virtual nodes 120-125 execute in computing environment 100 to provide various operations, such as remote desktop operations for end users, front-end applications, data processing applications, or some other similar operation. These virtual nodes may comprise full operating system virtual machines and/or containers, wherein the containers may comprise Linux containers, Docker containers, and other similar namespace based containers. Rather than requiring a separate operating system, which is required for virtual machines, containers may share resources from the host computing system, wherein the resources may include kernel resources from the host operating system, and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

To provide communications for the virtual nodes, networking elements 180-181 and edge gateways 160-161 are provided. Networking elements 180-181 comprise virtual switches that intelligently direct communications by inspecting packets before passing them to other computing nodes (physical and virtual). For example, packets, may be inspected by networking element 180-181 to determine the source and destination IP addresses to determine if the communication is permitted. If the communication is permitted the packet may be forwarded to the destination computing node. If the node is local to the same host, a virtual switch operating on the host may be used to direct the communication to the appropriate virtual node. In contrast, if the destination is on another physical computing system within computing site 110, a combination of virtual switches and physical routing elements may be used to route the communication to the appropriate nodes.

As demonstrated in the example of computing environment 100, in addition to networking elements 180-181, each computing site of computing sites 110-111 includes a corresponding edge gateway 160-161, which can be used as a router for the virtual machines to access other systems on the internet. In particular, edge gateways 160-161 may provide static routing, virtual private networking, load balancing, firewall operations, Dynamic Host Configuration Protocol (DHCP), and/or network address translation. In the present example, edge gateways 160-161 are further configured to maintain access control lists (ACLs) that are used in defining which nodes are capable of communication across multiple computing sites. Referring to an example in computing environment 100, virtual nodes 120 may be allocated a first IP address prefix and may be configured to communicate with virtual nodes 123 that are allocated a second IP address prefix. Consequently, to support communications between the nodes, edge gateway 160 may include an ACL entry that permits Internet Protocol Security (IPSec) communications between edge gateways 160-161 when a communication is identified with a source IP address corresponding to the IP address prefix for virtual nodes 120 and a destination IP address corresponding to the IP address prefix for virtual nodes 123.

FIG. 2 illustrates an operation 200 of an edge gateway to communicate IP address prefixes to a second edge gateway according to an implementation. The processes of operation 200 are described parenthetically in the paragraphs that follow with reference to systems and elements of computing environment 100. Although demonstrated in the example FIG. 2 as providing the IP address prefixes from edge gateway 160 to edge gateway 161, it should be understood that similar operations may be provided by edge gateway 161 in providing IP address prefixes to edge gateway 160.

As described herein, edge gateways 160 and 161 may be used to provide communications for virtual nodes across multiple computing sites. To support the communications, edge gateways may establish two distinct communication sessions between the computing sites. A first session comprises a Border Gateway Protocol (BGP) session that manages how packets are routed across the Internet through the exchange of routing and reachability information. In particular, BGP is used by edge gateways to send updates when routing information is modified for systems connected to the edge gateways. In addition to the BGP session, edge gateways may further establish at least one IPSec session, wherein IPSec comprises a network protocol suite capable of authenticating and encrypting packets communicated between the two nodes In the present example, edge gateway 160 establishes (201) a BGP session with at least one secondary edge gateway, such as edge gateway 161, at a second computing site. Once established, edge gateway may identify (202) one or more IP address prefixes for IP addresses assigned to virtual nodes in the first computing site. For example, edge gateway 160 may be configured to identify new virtual nodes (and their corresponding IP address prefix) as they are initiated within computing site 110. As an example in computing site 110, when virtual nodes 120-122 are initiated, edge gateway 160 may identify IP address prefixes associated with the nodes, wherein each set of virtual nodes 120-122 is allocated a separate IP address prefix, such as 30.X.X.X, 31.X.X.X, and 32.X.X.X. Once the virtual nodes are identified with their corresponding IP address prefixes, operation 200 may communicate (203), via BGP, the identified one or more IP address prefixes to the at least on secondary edge gateway. In this manner the edge gateways may provide status information using a session that is separate from the IPSec sessions used by the communicating virtual nodes. Returning to the examples of virtual nodes 120-122, three IP address prefixes may be provided to edge gateway 161, permitting edge gateway 161 to update a local ACL based on the provided IP address prefixes.

In some implementations, as the IP address prefixes are identified by edge gateway 160, edge gateway 160 may update its own local ACL prior to, during, or after the communication of the prefixes to edge gateway 161. In this manner both of the edge gateways may be updated as new virtual nodes become available in the computing environment. As an example, if edge gateway 160 already possessed the prefix information for virtual nodes 123-125, edge gateway 160 may update a local ACL with entries that permit the newly initiated virtual nodes 120-122 to communicate with virtual nodes 123-125. These ACL entries may define a source IP address prefix and a destination IP address prefix to identify packets that should be communicated over the IPSec link between edge gateway 160 and edge gateway 161.

As further illustrated in computing environment 100, edge gateways 160-161 may further be configured to communicate with management service 150, wherein management service 150 may be used to limit which virtual node networks are capable of communicating with other virtual node networks. For example, if virtual nodes 120 were only able to communicate with virtual nodes 123, then management service 150 may provide an indication that limits the ACL to only permitting the virtual nodes 120 to communicate with virtual nodes 123 although other virtual nodes may be executing at computing site 111.

FIG. 3 illustrates an operation 300 of an edge gateway to update an ACL according to an implementation. Operation 300 is referenced parenthetically in the paragraphs that follow with reference to systems and elements of computing environment 100 of FIG. 1. Although demonstrated in the example of FIG. 3 as edge gateway 161 receiving and updating a local ACL, it should be understood that similar operations may be employed by edge gateway 160.

As previously described in FIG. 2, edge gateways 160-161 may communicate via multiple communication sessions, wherein an IPSec session may be used in the communication for virtual nodes between the two gateways, and BGP may be used in managing the routing configuration for the gateways. Here, edge gateway 161 obtains (301) the one or more IP address prefixes from the first edge gateway 160, wherein the IP address prefixes correspond to IP addresses of virtual nodes executing in computing site 110. For example, if virtual nodes 120-121 were initiated in computing site 110, then edge gateway 160 may identify the prefixes associated with the nodes and provide the prefixes to edge gateway 161 via the established BGP session. Once the prefixes are received, edge gateway 161 may update (302) an ACL at the second edge router based on the one or more prefixes. These ACLs are used to define which networks local to computing site 111 are capable of communicating with networks in computing site 110 over the IPSec session between the edge gateways. For example, an ACL entry may define a source IP address prefix and a destination IP address prefix, wherein the edge gateway may perform packet inspection on egress packets to identify whether the packet should be encapsulated in the IPSec session to edge gateway 160.

Once the ACL is updated using the prefix information supplied from edge gateway 160, operation 300 further identifies (303) a communication request from a virtual node in computing site 111. In identifying the communication request, edge gateway 161 may identify traits within the header of the packet for the communication to identify at least a source IP address and a destination IP address for the communication. Once the source and destination IP addresses are identified, edge gateway may identify prefixes for each of the addresses. For example, if a source address comprises 42.1.2.3, then the prefix for the address may simply be 42. From the identified prefixes, edge gateway 161 may further determine (304) whether the communication qualifies for IPSec communication with the first edge gateway 160. In particular, edge gateway 161 may use the prefix information derived from the header of the packet and compare the prefix information to the ACL. If the source and destination prefixes match an entry in the ACL and the communication qualifies for a IPSec communication, the communication may be forwarded (305) to the destination edge gateway using the IPSec session between the gateways.

Although the previous example provided an operation to add to IP prefixes to the ACL, it should be understood that similar operations may be used to remove entries from the ACL. In particular, when a network of virtual nodes is no longer active within a computing site, the edge gateway for the computing site may notify other edge gateways of the lack of activity. In response, the other computing sites may update a corresponding ACL to prevent IPSec communications with IP addresses corresponding to the removed network of IP addresses. Additionally, while not demonstrated in the processes of operation 300, it should be understood that edge gateway 161 may update its local ACL based on new networks of virtual nodes being implemented at computing site 111. In particular, when a new network is detected with a new IP address prefix, edge gateway 161 may update the local ACL. Before during or after updating the local ACL using the IP address prefix, edge gateway 161 may provide information about the prefix using the BGP session between the edge gateways, wherein the BGP message may be used to configure the ACL at edge gateway 160 to support IPSec communications between the nodes of the different computing sites.

In addition to the operations of edge gateways 160-161, management service 150 is provided that can be used to configure which of the networks are capable of communication within computing environment 100. In particular, if virtual nodes are not permitted to communicate, such as virtual nodes 120 with virtual nodes 124, the ACLs may be configured based on this configuration. Further, management service 150 may define which of the networks are to communicate over a particular IPSec session between the edge gateways.

FIGS. 4A-4D illustrate an operational scenario of providing IP prefix updates between edge gateways according to an implementation. FIGS. 4A-4D include computing sites 410-411 with edge gateways 460-461 and virtual nodes 420-423 (virtual nodes 423 are added in FIG. 4B). Edge gateways 460-461 are each configured to maintain ACLs 462-463, respectively. Although demonstrated with two networks of virtual nodes in the present implementation, it should be understood that any number of virtual node networks may be implemented at each of the computing sites. It should also be understood that the ACLs could be enforced via a firewall application or a physical device.

Figure 4A:
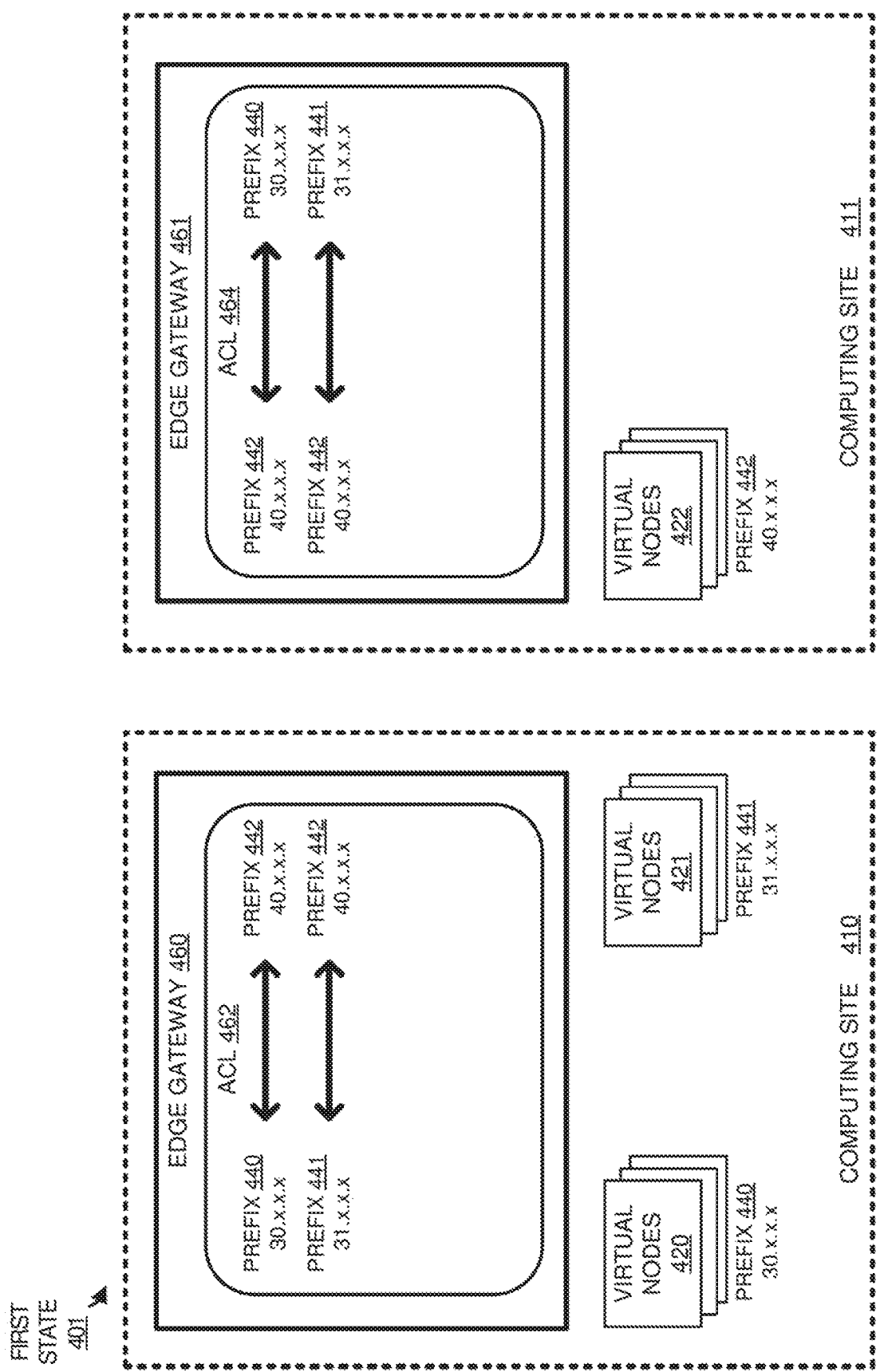
FIGS. 4A-4D illustrate an operational scenario of providing IP prefix updates between edge gateways according to an implementation.

Referring first to FIG. 4A and first state 401, computing site 410 includes virtual nodes 420-421 corresponding to IP address prefixes 440-441. Additionally, computing site 411 includes virtual nodes 422 with IP address prefix 442. As a result of the operating virtual nodes, edge gateways 460-461 maintain ACLs based on the currently operating virtual node networks. In particular, ACL 462 permits virtual nodes 420-421 to communicate with virtual nodes 422 over the IPSec session and, conversely, permits virtual nodes 422 to communicate with virtual nodes 420-421 over the IPSec session between the edge gateways. To provide the communications, each of the edge gateways identify a packet to be delivered from a virtual node at a first computing site to a virtual node at a second computing site. Once a packet has been identified, edge gateways 460-461 will perform packet inspection to identify IP address prefixes within the packet and apply the corresponding ACL. For example, if a virtualnode in virtual nodes 420 were to communicate with a virtual node in virtual nodes 422, edge gateway 460 may perform packet inspection to identify a prefix for the source IP address and the destination IP address. Once the prefixes are identified, edge gateway 460 may determine if an entry within ACL 462 applies and, if it applies, forward the communication using the IPSec session between the edge gateways.

Figure 4B:
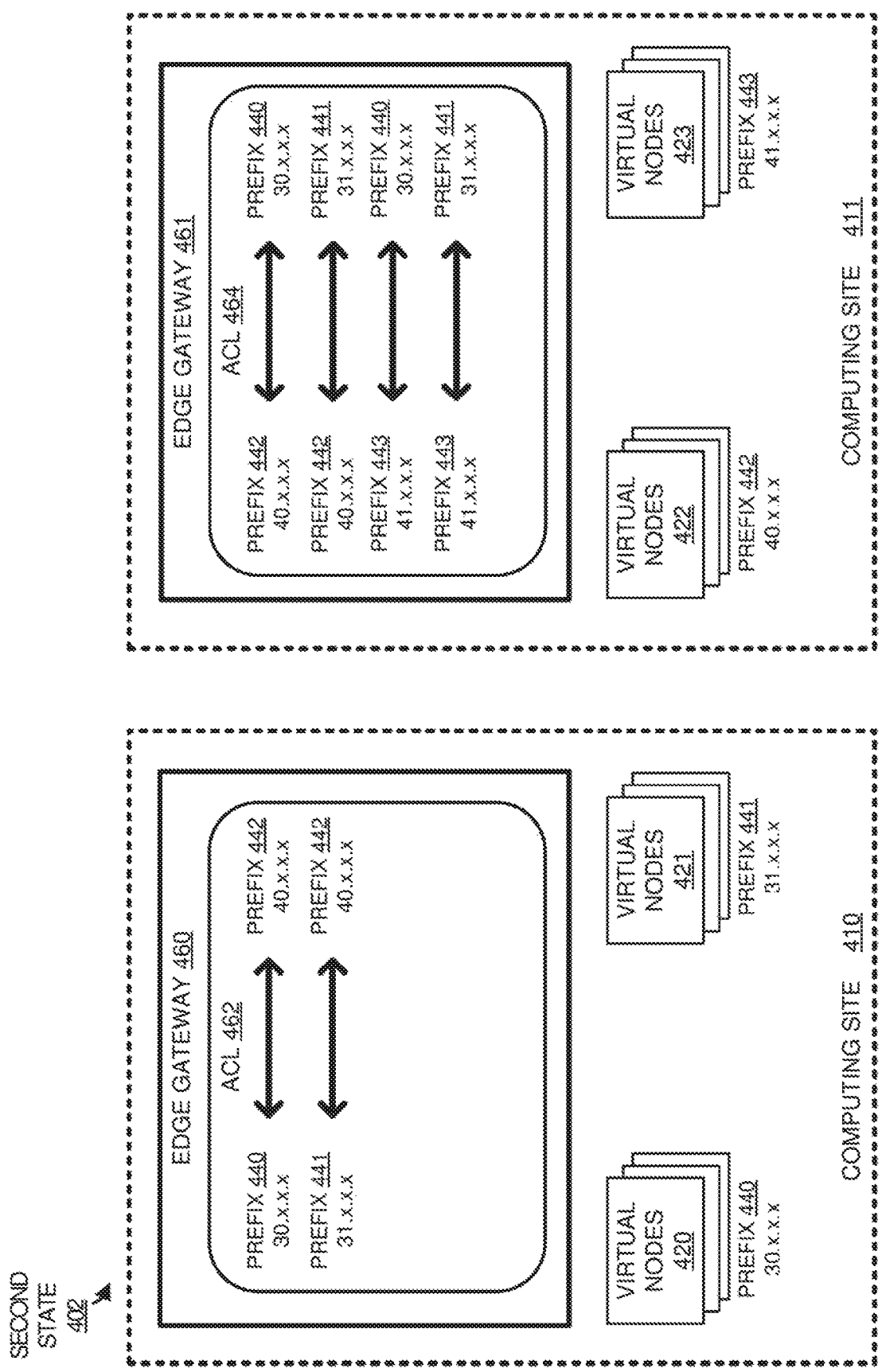

Turning to FIG. 4B, FIG. 4B illustrates second state 402 and the addition of virtual nodes to computing site 411. In the present example, virtual nodes 423 corresponding to a new network (new IP address prefix 443) are added to computing site 411. This new set of virtual nodes may provide a new operation, such as data processing, database management, or some other operation, may provide a backup of a current set of virtual nodes, or may provide some other functionality within the computing environment. Once the virtual nodes are added, edge gateway 461 identifies the operation of the new virtual nodes and updates ACL 464 to reflect the addition of the new virtual nodes. As demonstrated in the example of second state 402, edge gateway 461 adds entries that permit prefix 443 to communicate with prefixes 440-441 associated with virtual nodes 420-421 at first computing site 410. In some implementations, to identify the new IP address prefixes, the virtual switches associated with the virtual nodes may provide a notification to edge gateway 461 indicating the addition of the virtual nodes. In other implementations, as the virtual nodes are initiated within the computing environment, the virtual machines may provide a packet or some other notification to edge gateway 461 indicating the addition of the virtual nodes. In still another implementation, a management system associated with the computing environment may provide an indication to the edge gateway indicating the addition of virtual nodes to the computing site.

Figure 4C:
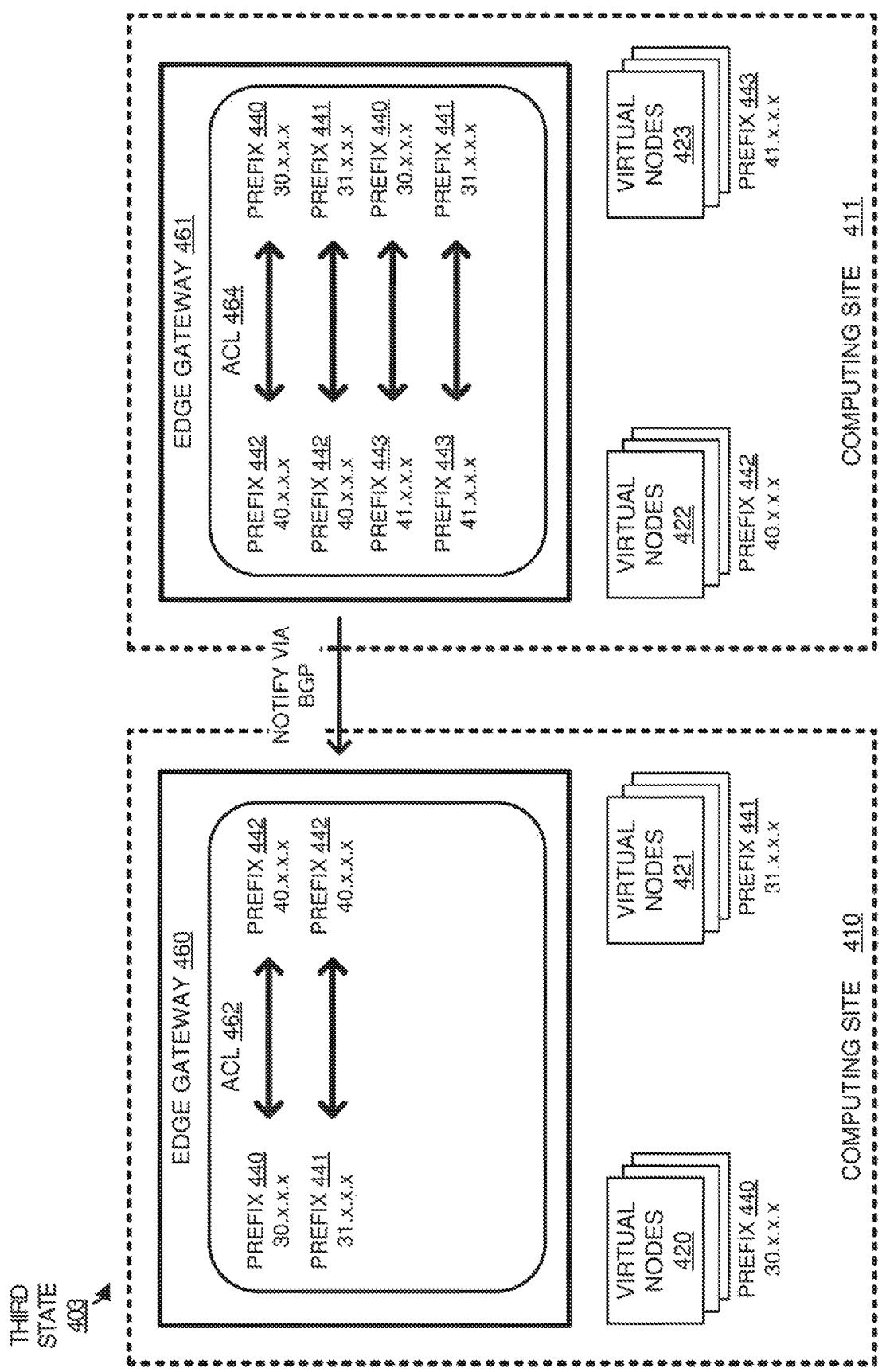

Referring now to FIG. 4C, FIG. 4C illustrates third state 403 representating the communication of a notification from edge gateway 461 to edge gateway 460. As described herein edge gateways may establish multiple communication sessions to provide the desired operation in the network. A first BGP session may be used to provide configuration and management information between the routers, while a second session or sessions may be used to provide the required IPSec communications for virtual nodes in the computing environment. Here, once virtual nodes 423 are identified by edge gateway 461, edge gateway 461 notifies edge gateway 460 of prefix 443 that correspond to virtual nodes 423. This notification may be provided to edge gateway 460 using one or more packets, and may include information about the IP address prefixes and any other routing configuration information for the receiving gateway.

Figure 4D:
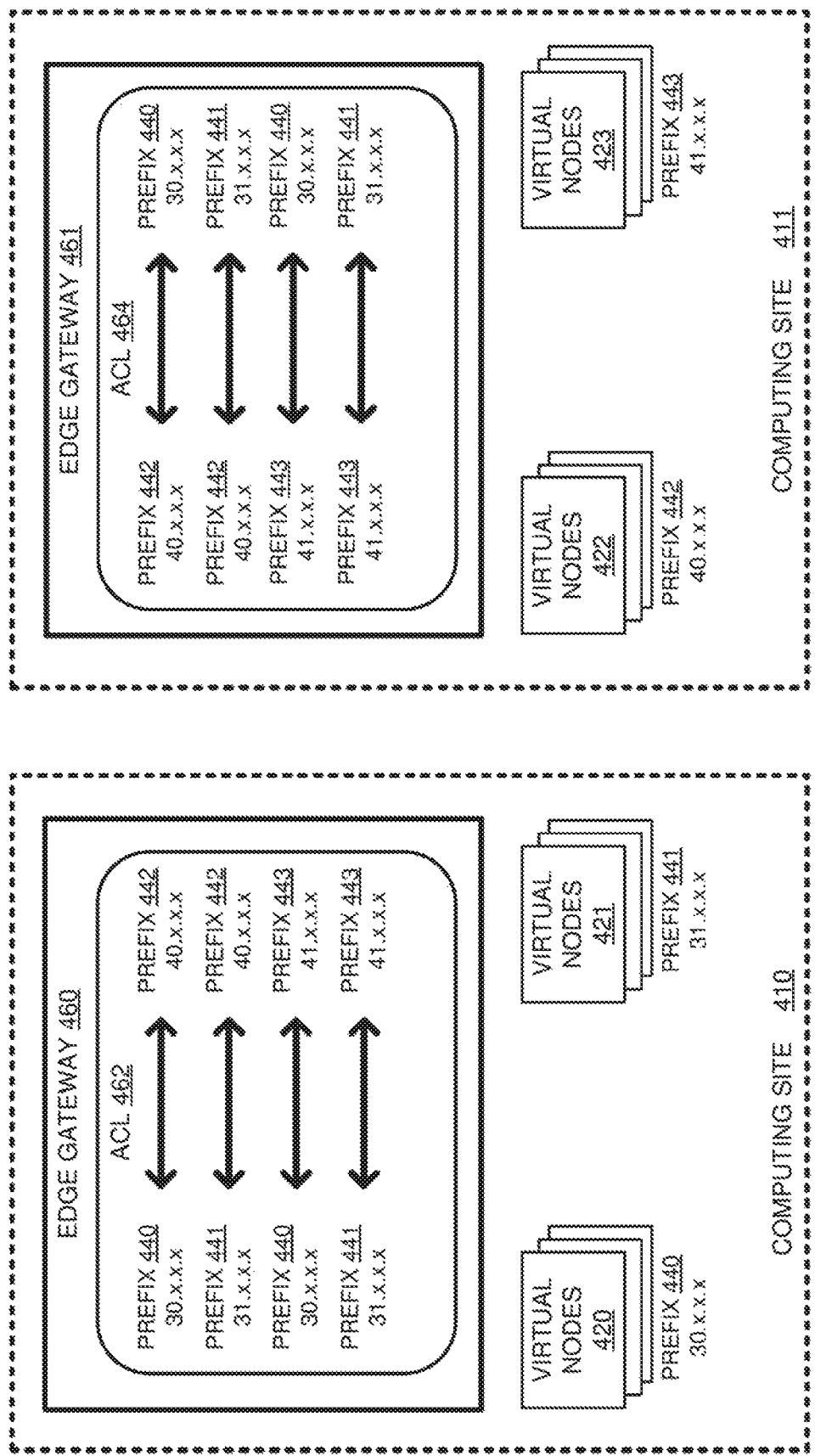

Turning to FIG. 4D, FIG. 4D illustrates a fourth state 404 representing the updating of ACL 462 based on the information from the BGP communication from edge gateway 461. As depicted, once the BGP notification is received from edge gateway 461, edge gateway 460 may parse the packet or packets to identify any new prefix information for virtual nodes executing at edge gateway 461. Once a prefix is identified, ACL 462 may be updated based on the corresponding prefix, wherein the update may permit virtual nodes 420-421 to communicate with newly initiated virtual nodes 423 at computing site 411. In particular, two new entries are added to ACL 462 in the present example. The first permits prefix 440 corresponding to virtual nodes 420 to communicate with prefix 443 corresponding to virtual nodes 423, and the second permits prefix 441 corresponding to virtual nodes 420 to communicate with prefix 443 corresponding to virtual nodes 423.

After ACL 462 is updated with the prefix information from edge gateway 461, ACL 462 may be used in managing communications from a virtual node at computing site 410 to a virtual node at computing site 411. For example, if a virtual node in virtual nodes 420 were to direct a packet at a virtual node in virtual nodes 422, edge gateway 460 may identify the communication and perform packet inspection to identify an IP address prefix for the source and an IP address prefix associated with the destination. Once the prefixes are identified, the prefixes may be compared to the information within the ACL to determine whether the communication qualifies for a IPSec session between edge gateway 460 and edge gateway 461. If the communication does not qualify for the session, the communication may be blocked or may be forwarded to the destination without the use of a IPSec session. In contrast, if the communication is permitted for the IPSec session, the communication may be encapsulated and transferred to the destination using the IPSec session.

Although demonstrated in the example of FIGS. 4A-4D as updating ACL 464 prior to providing the BGP notification to edge gateway 460, it should be understood that ACL 464 may be updated at any time prior to, during, or after the communication with edge gateway 460. Moreover, while demonstrated in the example of FIGS. 4A-4D as transferring a BGP communication to add additional IP address prefixes to a ACL, it should be understood that similar operations may be used to remove IP address prefixes from an ACL. In particular, an edge gateway may monitor for the removal of a network of virtual nodes at its computing site, such as the removal of virtual nodes 420 at computing site 410. In response to the removal or cease in operations of the virtual node network, edge gateway 460 may provide a notification to edge gateway 460 indicating the cease in operation of the virtual nodes.

In some implementations, although not illustrated in the operational scenario of FIGS. 4A-4B, one or more management systems may be used in the configuration of the computing sites. These management systems may initiate virtual nodes, define firewall rules and virtual networks, or provide some other similar management operation. In some examples, the management systems may define which of the computing networks (or nodes with the same IP address prefix) are capable of communicating with other computing networks, or which computing networks are to communicate via the IPSec session between computing sites.

Figure 5:
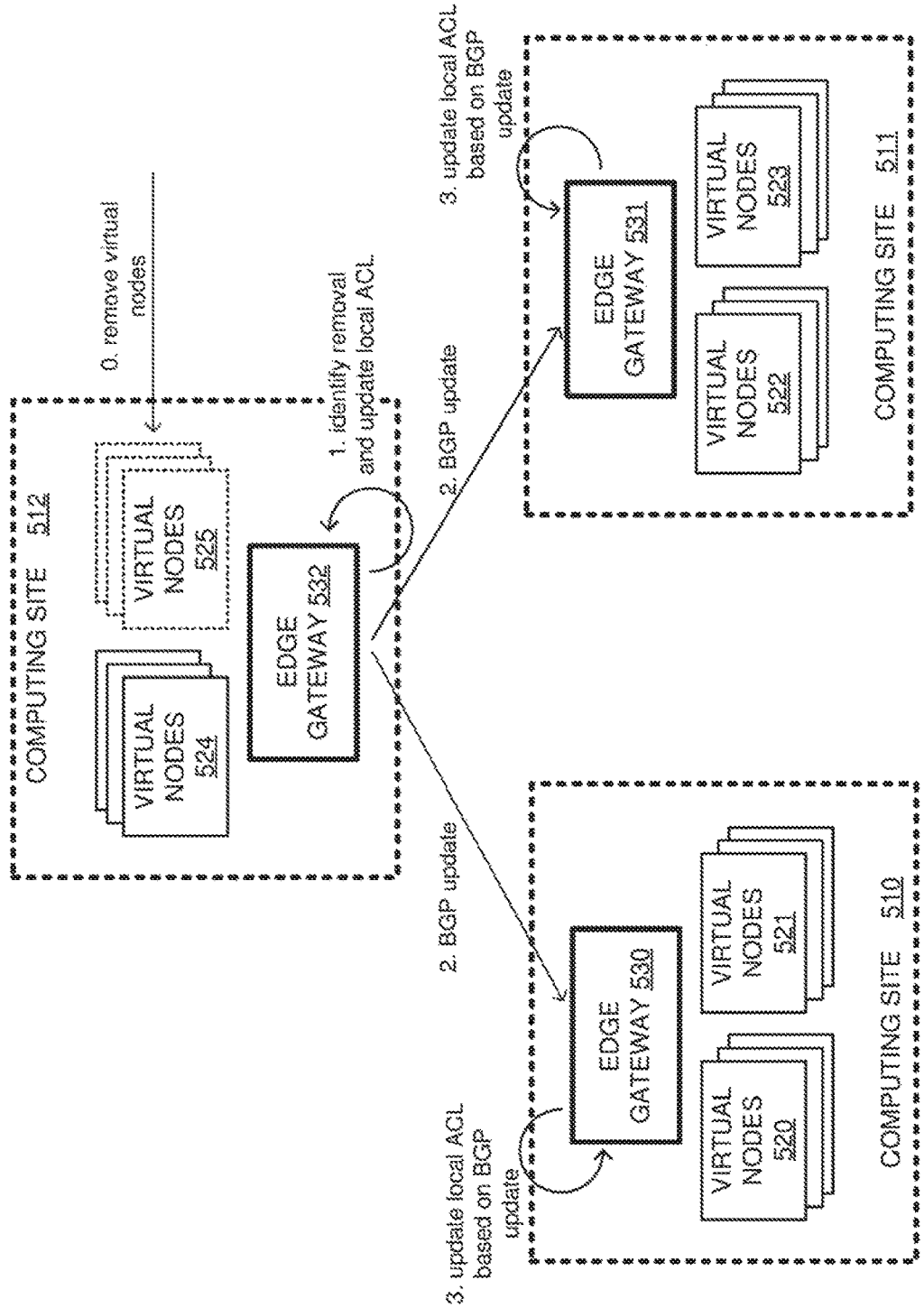
FIG. 5 illustrates an operational scenario of providing IP prefix updates between edge gateways according to an implementation.

FIG. 5 illustrates an operational scenario of providing IP prefix updates between edge gateways according to an implementation. FIG. 5 includes computing sites 510-512 with virtual nodes 520-525 and edge gateways 530-532. Although demonstrated in the present example using three computing sites, it should be understood that additional or fewer computing sites may be implemented in a computing environment in some examples.

As described herein, an organization may employ various computing sites to provide required operations for the organization. These sites may provide expandable processing, failover provisions for an existing site, or some other similar operation for the organization. To provide communications between the virtual nodes, each of the computing sites is provided with a corresponding edge gateway of edge gateways 530-532. These edge gateways may provide static routing, virtual private networking, load balancing, firewall operations, DHCP, and/or network address translation. In the present example, edge gateways 160-161 are further configured to maintain ACLs that are used in defining which nodes are capable of communication across multiple computing sites using an existing IPSec session between the edge gateways. For example, virtual nodes 520 may use an IPSec session to communicate with virtual nodes 524 at computing site 512.

In the present implementation, virtual nodes 525, at step 0, are removed from operation at computing site 512. This removal of the virtual nodes may occur at a particular time, may occur based on an instruction from a management system, or may occur at some other similar event. In response to the removal of the virtual nodes, edge gateway 532 identifies the removal, at step 1, and updates the local ACL to reflect the removal of the virtual nodes. In some implementations, to identify the removal of the virtual nodes, edge gateway 532 may monitor the virtual nodes to ensure that they are still active. In other implementations, edge gateway 532 may receive an instruction from a management system indicating that the virtual nodes are no longer active within the environment. Once it is identified that the virtual nodes are no longer active, edge gateway 532 may identify an IP address prefix that is associated with the with the removed virtual nodes. This IP address prefix may then be used to update a local ACL at edge gateway 532, wherein the ACL is used in determining which communications qualify for an IPSec session with other computing sites. For example, at least one ACL may be used in determining whether an IPSec session should be used in communications from virtual nodes 524 with other virtual nodes at other computing sites.

After the IP address prefix is identified that is associated with the virtual nodes, edge gateway 532 may, at step 2, provide a BGP update to other edge gateways in the computing environment, wherein the BGP update includes information about the IP address prefix associated with virtual nodes 525, as well as an indication that the virtual nodes are no longer active. In some implementations, the information in the BGP packets may be provided as a standalone update, however, it should be understood that additional configuration information may be provided in the update.

Once the BGP update is received by edge gateways 530-531, each of the edge gateways may update, at step 3, local ACLs based on the BGP update. As described in previous examples, each of the edge gateways may maintain at least one ACL that defines permissions information for virtual nodes to communicate with other virtual nodes at distinct computing sites. Virtual nodes that qualify for an entry within the ACL may be communicated using IPSec protocol, wherein the IPSec communication encrypts and encapsulates the packets for the virtual nodes to be communicated between edge gateways. Using the example provided in operational scenario 500, when virtual nodes 525 cease operation in the computing environment, edge gateways 530-531 may update their ACLs to prevent IPSec protocol communications that correspond to virtual nodes 525.

Once the ACLs are updated locally at the edge gateways, the edge gateways may perform packet inspection to determine whether the packet is permitted to be communicated with other computing sites using an IPSec session. As an example, when virtual nodes 520 initiate a communication with virtual nodes 524, the packets may be inspected to determine whether the packets correspond to the IPSec session, and if they are permitted for the IPSec session, then forward the communication by encapsulating the packets and forwarding via the IPSec communication.

In some implementations, such as that demonstrated in operational scenario 500, each of the edge gateways in a computing environment may establish multiple BGP session, wherein each of the sessions may correspond to a different edge gateway of a different computing site. For example, edge gateway 530 may establish a first BGP session with edge gateway 531 and may establish a second BGP session with edge gateway 532. Similarly, each of the edge gateways may establish multiple IPSec sessions permitting the edge gateway to provide secure communication for the virtual nodes to multiple computing sites.

Although demonstrated in the examples of FIGS. 1-5 using the communication of IP address prefix information to maintain IPSec communications over multiple sites, it should be understood that similar operations may be applied in providing media access control (MAC) addresses between edge gateways. In particular, as virtual nodes communicate at a particular computing site the edge gateway at that site may identify the MAC addresses that are associated with the newly identified virtual nodes. Once identified, the MAC addresses may be provided in a BGP communication to other edge gateways, permitting the other edge gateways to implement layer 2 encryption operations similar to those described above. Thus, using the MAC address example, rather than providing packet inspection to identify an IP address, the gateway may identify source and destination MAC addresses within a packet. Once identified, a MAC ACL may be consulted to determine whether the communication should be encrypted as a MACSec frame. If the communication qualifies for a MACSec frame to be delivered to another edge gateway, the communication will be encapsulated and transferred to the destination edge gateway. In contrast, if the communication does not qualify, then the communication may be blocked or communicated without the use of the MACSec encapsulation. In this manner, layer 2 updates and encryption may be used in providing communications between computing sites.

Figure 6:
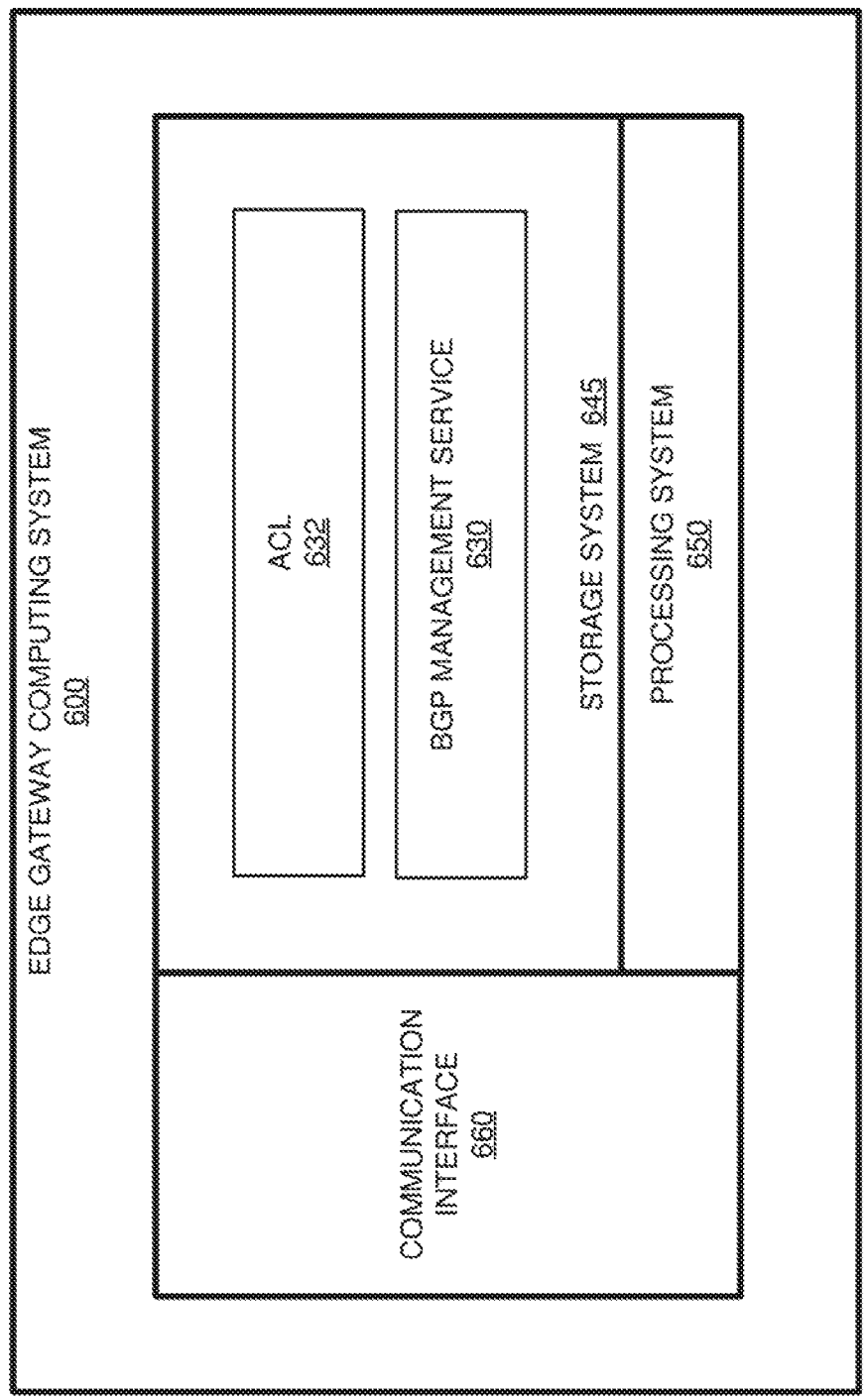
FIG. 6 illustrates an edge gateway computing system capable of updating access control lists according to an implementation.

FIG. 6 illustrates an edge gateway computing system 600 capable of updating ACLs according to an implementation. Computing system 600 is representative of any computing system or systems with which the various operational architectures, processes, scenarios, and sequences disclosed herein for an edge gateway can be implemented. Computing system 600 is an example of edge gateways 160-161 of FIG. 1 or edge gateways 460-461 of FIGS. 4A-4D, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is configured to communicate with other edge gateways corresponding to other computing sites for an organization. Communication interface 660 may further be configured to communicate with one or more host computing systems in a computing site capable of providing a platform for virtual nodes, such as virtual machines and containers.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device, but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises ACL 632 and BGP management service 630 capable of providing at least operation 200 of FIG. 2 and operation 300 of FIG. 3. The operating software on storage system 645 may further include an operating system, utilities, drivers, network interfaces, applications, or some other type of software. When read and executed by processing system 650 the operating software on storage system 645 directs computing system 600 to operate as described herein.

In at least one implementation, BGP management service 630, when read and executed by processing system 650, directs processing system 650 to obtain, via BGP, one or more IP address prefixes from a second edge gateway of a second computing site. In particular, edge gateway computing system 600 may be configured to provide routing services for virtual nodes of a particular computing site. To ensure that virtual nodes at the computing site can communicate with other computing nodes at other computing sites, such as a second computing site for an organization, edge gateway computing system 600 may maintain ACL 632. In maintaining ACL 632, when a BGP communication is received with IP address prefixes, BGP management service 630 updates ACL 632 based on the received prefixes. In updating the ACL, the ACL may define which source IP addresses associated with virtual machines local to the computing site of edge gateway computing system 600 may communicate with virtual nodes at a second computing site using at least a IPSec communication session between edge gateways.

Once the ACL is updated, BGP management service 630 may identify a communication from a local virtual node to a computing element outside of the local network. In response to identifying the communication, edge gateway computing system 600 will perform packet inspection to identify source and destination IP addresses associated with the packet. After inspection, the IP addresses will be applied to ACL 632 to determine whether the communication requires the use of a IPSec session with a second edge gateway. If the IPSec session is required, edge gateway computing system 600 may encapsulate the packet for the session and transfer the packet to the destination edge gateway and corresponding virtual node. In contrast, if the communication does not qualify for the IPSec session, edge gateway computing system 600 may block the packet or transfer the packet to the destination without the use of the IPSec session.

Although demonstrated in the previous example as receiving a BGP notification indicating IP address prefixes at another computing site, it should be understood that similar operations may be used in providing IP address prefixes to edge gateways at other computing sites. In particular, as new networks (virtual nodes with the same IP address prefix) are initiated at the computing environment associated with edge gateway computing system 600, the edge gateway may identify the new prefixes. In response to identifying the new prefixes, ACL 632 may be updated to reflect the newly initiated virtual nodes, and may further generate a BGP notification to be provided to other computing sites indicating the newly added IP address prefix. The BGP notification may then be used to update ACLs at the other computing sites.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a first edge gateway in a first computing site, the first computing site comprising a plurality of virtual nodes, the method comprising:
    obtaining, via border gateway protocol (BGP), one or more internet protocol (IP) address prefixes from a second edge gateway of a second computing site;
    updating an access control list (ACL) at the first edge gateway based on the one or more IP address prefixes, wherein the ACL provides permissions for Internet Protocol Security(IPSec) communications between the plurality of virtual nodes at the first computing site that use one or more first IP address prefixes and a plurality of virtual nodes at the second computing site that use one or more second IP address prefixes, and wherein each entry in the ACL associates an IP address prefix of the first one or more IP address prefixes with an IP address prefix of the one or more second IP address prefixes;
    identifying a communication from a virtual node at the first computing site;
    determining whether the communication qualifies for an IPSec communication with the second edge gateway based on the ACL and at least a destination IP address for the communication; and
    when the communication does qualify for an IPSec communication, transferring the communication to the second edge gateway via IPSec protocol.

2. The method of claim 1, wherein the plurality of virtual nodes at the first computing site and the second computing site comprise virtual machines and/or containers.

3. The method of claim 1 further comprising, when the communication does not qualify for a IPSec communication, blocking the communication.

4. The method of claim 1 further comprising establishing a BGP session with the second edge gateway at the second computing site.

5. The method of claim 1 further comprising:
    identifying one or more additional IP address prefixes for one or more additional virtual nodes executing at the first computing site;
    updating the ACL based on the identified one or more additional IP address prefixes; and
    transfer, via BGP, the one or more additional IP address prefixes to the second edge gateway.

6. The method of claim 5 further comprising transferring the one or more additional IP address prefixes to a third edge gateway of a third computing site using BGP.

7. The method of claim 1 further comprising:
    obtaining, via BGP, one or more additional IP address prefixes from the second edge gateway of the second computing site;
    updating the ACL at the first edge gateway based on the one or more additional IP address prefixes.

8. The method of claim 1, wherein determining whether the communication qualifies for an IPSec communication with the second edge gateway based on the ACL and at least the destination IP address for the communication comprises determining whether the communication qualifies for an IPSec communication with the second edge gateway based on the ACL, the destination IP address for the communication, and a source IP address for the communication.

9. A computer system:
one or more non-transitory computer readable media;
a processing system operatively coupled to the one or more non-transitory computer readable media; and
program instructions stored on the one or more non-transitory computer readable storage media to maintain an access control list (ACL) at the first edge gateway of a first computing site that, when read and executed by the processing system, direct the processing system to at least:
obtain, via border gateway protocol (BGP), one or more internet protocol (IP) address prefixes from a second edge gateway of a second computing site;
update an ACL at the first edge gateway based on the one or more IP address prefixes, wherein the ACL provides permissions for Internet Protocol Security (IPSec) communications between a plurality of virtual nodes at the first computing site that use one or more first IP address prefixes and a plurality of virtual nodes at the second computing site that use one or more second IP address prefixes, and wherein each entry in the ACL associates an IP address prefix of the first one or more IP address prefixes with an IP address prefix of the one or more second IP address prefixes;
identify a communication from a virtual node at the first computing site;
determine whether the communication qualifies for an IPSec communication with the second edge gateway based on the ACL and at least a destination IP address for the communication; and
when the communication does qualify for an IPSec communication, transfer the communication to the second edge gateway via IPSec protocol.

10. The computer system of claim 9, wherein the plurality of virtual nodes at the first computing site and the second computing site comprise virtual machines and/or containers.

11. The computer system of claim 9, wherein the program instructions further direct the processing system to, when the communication does not qualify for a IPSec communication, block the communication.

12. The computer system of claim 9, wherein the program instructions further direct the processing system to establish a BGP session with the second edge gateway at the second computing site.

13. The computer system of claim 9, wherein the program instructions further direct the processing system to:
identify one or more additional IP address prefixes for one or more additional virtual nodes executing at the first computing site; and
update the ACL based on the identified one or more additional IP address prefixes; and
transfer, via BGP, the one or more additional IP address prefixes to the second edge gateway.

14. The computer system of claim 13, wherein the program instructions further direct the processing system to transfer the one or more additional IP address prefixes to a third edge gateway of a third computing site using BGP.

15. The computer system of claim 9, wherein the program instructions further direct the processing system to:
obtain, via BGP, one or more additional IP address prefixes from the second edge gateway of the second computing site;
update the ACL at the first edge gateway based on the one or more additional IP address prefixes.

16. The computer system of claim 9, wherein determining whether the communication is permitted based on the ACL and at least the destination IP address for the communication comprises determining whether the communication is permitted based on the ACL, the destination IP address for the communication and a source IP address for the communication.

17. A system comprising:
a first computing system to provide a first edge gateway of at a first computing site, the first computing site comprising a plurality of virtual nodes, and the first computing system configured to:
transfer, via border gateway protocol (BGP), one or more internet protocol (IP) address prefixes corresponding to virtual nodes executing at the first computing site to a second edge gateway of a second computing site;
a second computing system to provide the second edge gateway of at the second computing site, the second computing site comprising a plurality of virtual nodes, and the second computing system configured to:
obtain the one or more IP address prefixes from the first edge gateway;
update an access control list (ACL) at the second edge gateway based on the one or more IP address prefixes, wherein the ACL provides permissions for Internet Protocol Security (IPSec) communications between the plurality of virtual nodes at the first computing site that use one or more first IP address prefixes and the plurality of virtual nodes at the second computing site that use one or more second IP address prefixes, and wherein each entry in the ACL associates an IP address prefix of the first one or more IP address prefixes with an IP address prefix of the one or more second IP address prefixes;
identify a communication from a virtual node at the second computing site;
determine whether the communication qualifies for an IPSec communication with the first edge gateway based on the ACL and at least a destination IP address for the communication; and
when the communication does qualify for an IPSec communication, transfer the communication to the first edge gateway via IPSec protocol.

18. The system of claim 17, wherein the plurality of virtual nodes at the first computing site and the second computing site comprise virtual machines and/or containers.

19. The system of claim 18 further comprising a third computing system to provide a third edge gateway at a third computing site, and wherein the second edge gateway is further configured to transfer, via BGP, the one or more additional IP address prefixes to the third computing site.

20. The system of claim 17, wherein second computing system is further configured to:
identify one or more additional IP address prefixes for one or more additional virtual nodes executing at the second computing site;
update the ACL based on the identified one or more additional IP address prefixes; and
transfer, via BGP, the one or more additional IP address prefixes to the first edge gateway.

* * * * *